United States Patent
Muhlenkamp

(12) 
(10) Patent No.: US 6,260,675 B1
(45) Date of Patent: Jul. 17, 2001

(54) MAGNETORHEOLOGICAL FLUID DAMPER

(75) Inventor: John H. Muhlenkamp, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/494,977

(22) Filed: Jan. 31, 2000

(51) Int. Cl.$^7$ .................................................. F16F 15/03
(52) U.S. Cl. ...................................... 188/267; 267/140.14
(58) Field of Search ............................... 188/267, 267.1; 267/140.14, 140.15

(56) References Cited

U.S. PATENT DOCUMENTS

| | | |
|---|---|---|
| 2,661,596 | 12/1953 | Winslow . |
| 3,174,587 * | 3/1965 | Walton ............................. 188/267.1 |
| 3,207,269 | 9/1965 | Klass . |
| 4,958,704 * | 9/1990 | Leiber et al. ........................ 188/285 |
| 5,277,281 | 1/1994 | Carlson et al. . |
| 5,632,361 | 5/1997 | Wulff et al. . |
| 5,878,851 | 3/1999 | Carlson et al. . |

FOREIGN PATENT DOCUMENTS

98/00653  1/1998  (WO) .

* cited by examiner

Primary Examiner—Christopher P. Schwartz
(74) Attorney, Agent, or Firm—Robert M. Sigler

(57) ABSTRACT

A novel and improved magnetorheological fluid damper is provided which effectively secures a flux ring to a piston core in a manner which prevents relative axial and radial movement between the flux ring and the core throughout operation. The damper includes crimp portions formed on each end of the flux ring for engaging respective end plates positioned at each end of the piston core to secure the end plates and thus the flux ring to the piston core. One of the end plates may, in turn, function to maintain a piston rod in connection with the piston core. Specifically, each end plate functions as a spring device by being elastically deformed during a crimping process causing the end plates to apply a spring force against the flux ring. One of the end plates may also apply another spring force to the piston rod. A crimping method is also provided which effectively and efficiently permits crimping in a simple manner.

19 Claims, 2 Drawing Sheets

MAGNETORHEOLOGICAL FLUID DAMPER

TECHNICAL FIELD

The present invention relates to a magnetorheological fluid damper and, more particularly, to a linear acting fluid damper for a vehicle suspension employing magnetic tuning in connection with a magnetorheological working fluid to effect desired damping levels.

BACKGROUND OF THE INVENTION

Magnetorheological fluids that comprise suspensions of magnetic particles such as iron or iron alloys in a fluid medium are well known. The flow characteristics of these fluids can change by several orders of magnitude within milliseconds when subjected to a suitable magnetic field due to suspension of the particles. The ferromagnetic particles remain suspended under the influence of magnetic fields and applied forces. Such magnetorheological fluids have been found to have desirable electro-magnetomechanical interactive properties for advantageous use in a variety of magnetorheological (MR) damping devices, such as rotary devices including brakes and clutches, and linear-acting devices for damping linear motion or for providing controllable dissipative forces along the damper's axis.

In particular, linear acting MR dampers are commonly used in suspension systems, such as a vehicle suspension system and vehicle engine mounts. PCT patent application 10840, published Jan. 8, 1998 (the '840 application), discloses a conventional linear acting controllable vibration damper apparatus which includes a piston positioned in a magnetorheological fluid-filled chamber to form upper and lower chambers. The piston includes a coil assembly, a core, i.e. pole pieces, and an annular ring element positioned around the pole pieces to form an annular flow passage for permitting flow of the magnetorheological fluid between the chambers. When the piston is displaced, magnetorheological fluid is forced through the annular flow passage. When the coil is energized, a magnetic field permeates the channel and excites a transformation of the magnetorheological fluid to a state that exhibits damping forces.

In damper designs utilizing an annular flow passage, the radial width of the annular flow passage must be precisely set and maintained along the axial length of the passage throughout operation to ensure optimum, predictable control of the damping performance. Thus, the annular ring must be securely and concentrically mounted on the coil assembly to prevent axial and radial movement. The '840 application discloses the use of a plurality of bridge elements interconnecting the pole piece and the annular ring element. The bridge elements may include circumferentially spaced welds formed of nonmagnetic material. Also, each bridge may include a nonmagnetic pin to further locate and retain the pole relative to the ring. In another embodiment, the pole and ring are connected using a nonmagnetic plate positioned at one end of the assembly. The plate includes radially extending tabs forming bridging elements positioned outside and immediately adjacent the annular passage so as to extend across one end of the annular passage. The plate is secured to the pole piece and the ring by spot welds.

However, the means for connecting the ring and pole piece of the damper disclosed in the '840 application may result in specific disadvantages. For example, the plate tabs and welds are undesirably positioned immediately adjacent one end of the annular flow gap and, therefore, necessarily block fluid flow into the gap along the extent of the tabs and welds thereby disadvantageously reducing the effective shearing surface area of the damper resulting in a reduction in the MR effect. Also, the welds, pins and radial tabs of the plate each include blunt surfaces exposed to the fluid flow that undesirably impede the flow and increase uncontrollable drag forces which lead to a reduction in turn-up ratio performance of the assembly. In addition, the process required to position the plates and form the welds can be difficult and unnecessarily time consuming and expensive.

Also, in all MR damper designs, the various components of the piston assembly must be secured together and the piston rod must be effectively secured to the piston assembly. The '840 application discloses the use of a threaded connection between the piston rod and the piston core. In other designs, the rod extends completely through the core for connection with a nut which secure the entire assembly together. In both cases, an elongated central bore having an unnecessarily long length must be formed in the piston core to receive the rod and ensure complete passage of the rod or an effective threaded connection. Due to the reduction in core material, the magnetic flux generation capability of the core/pole pieces is significantly reduced or a larger core is required to achieve the same flux level. Also, the use of a nut attached to the outer end of a rod extending through the piston core adds to the length of the piston with additional parts resulting in an undesirably large and costly assembly possibly incapable of meeting the packaging constraints of a particular application.

Therefore, there is a need for a more compact, less costly MR damper capable of effectively and controllably damping motion.

SUMMARY OF THE INVENTION

It is an object of the present invention, therefore, to overcome the disadvantages of the prior art and to provide a magnetorheological (MR) fluid damper which effectively maintains axial and radial alignment between a flux ring and a piston core while effectively and predictably providing a desired damping effect and minimizing the size and cost of the damper.

This and other objects of the present invention are achieved by providing a damper comprising a cylinder containing a magnetorheological fluid and a piston and magnet assembly mounted for reciprocal movement in the cylinder to form a first chamber positioned on one side of the piston and magnet assembly and a second chamber positioned on an opposite side of the piston and magnet assembly. The piston and magnet assembly adapted to generate a magnetic field and including a piston core and a flux ring positioned around the piston core to form a first flow gap sized to permit magnetorheological fluid flowing through the flow gap to experience a magnetorheological effect affecting the flow of the magnetorheological fluid through the flow gap. The piston and magnet assembly further includes a first end plate positioned at one end of the piston assembly wherein at least one of the flux ring and the first end plate include a first crimp portion connecting the flux ring to the first end plate. The first crimp portion may be formed on the flux ring and extend radially along the first end plate and/or annularly around the first end plate. The piston and magnet assembly may further include a second end plate positioned at an opposite end of the piston and magnet assembly from the first plate wherein the flux ring is connected to the second end plate. The flux ring may include a second crimp portion connecting the flux ring to the second end plate. The damper may further include a rod extending through the first end plate and positioned in abutment with the piston core only at a nonthreaded interface so that the first and second crimp portions connect the core, rod, flux ring and first and second end plates together to form the piston and magnet assembly. The first and second end plates may include an outer annular surface for engagement by the first and second crimp portions. The piston core may include a first end, a second end and a respective locating step positioned at each of the first and the second ends a fixed predetermined radial distance from a central axis of the rod. The first and the second end plates may be positioned in abutment with a respective one of the locating steps to determine a radial position of the outer annular surface of the respective first and second end plates.

The present invention is also directed to a magnetorheological damper comprising a cylinder containing a magnetorheological fluid and a piston and magnet assembly mounted for reciprocal movement to form a first and second chambers wherein the piston and magnet assembly further includes a spring device for applying a spring force against the flux ring to prevent relative movement between the flux ring and the piston core. The spring force may be applied axially against the flux ring. The damper further includes a rod positioned adjacent the piston core. The spring force may include a first spring force acting on the flux ring to maintain connection between the flux ring and the piston core and a second spring force connecting the rod to the piston core. The spring device may further function at least partially for connecting the piston core, the rod and the flux ring together to form the piston and magnet assembly. The rod may be positioned in abutment with the piston core only at a nonthreaded interface. The spring device may include a first end plate positioned at one end of the piston and magnet assembly and a second end plate positioned at an opposite end of the piston and magnet assembly.

The present invention is also directed to a method of making a piston and magnet assembly for a magnetorheological damper, comprising the steps of providing a flux ring having a first crimp portion, providing a first end plate, positioning the first end plate adjacent the flux ring and crimping the first crimp portion into engagement with the first end plate. The flux ring may include a second crimp portion and the method may include the steps of providing a second end plate and crimping the second crimp portion into engagement with the second end plate. Also, the step of crimping the first crimp portion may occur simultaneously with the step of crimping the second crimp portion. In addition, the step of crimping the first crimp portion may include simultaneous bending of the first end plate to create a spring force for securing the flux ring to the first end plate.

DETAILED DESCRIPTION OF THE INVENTION

Figure 1:
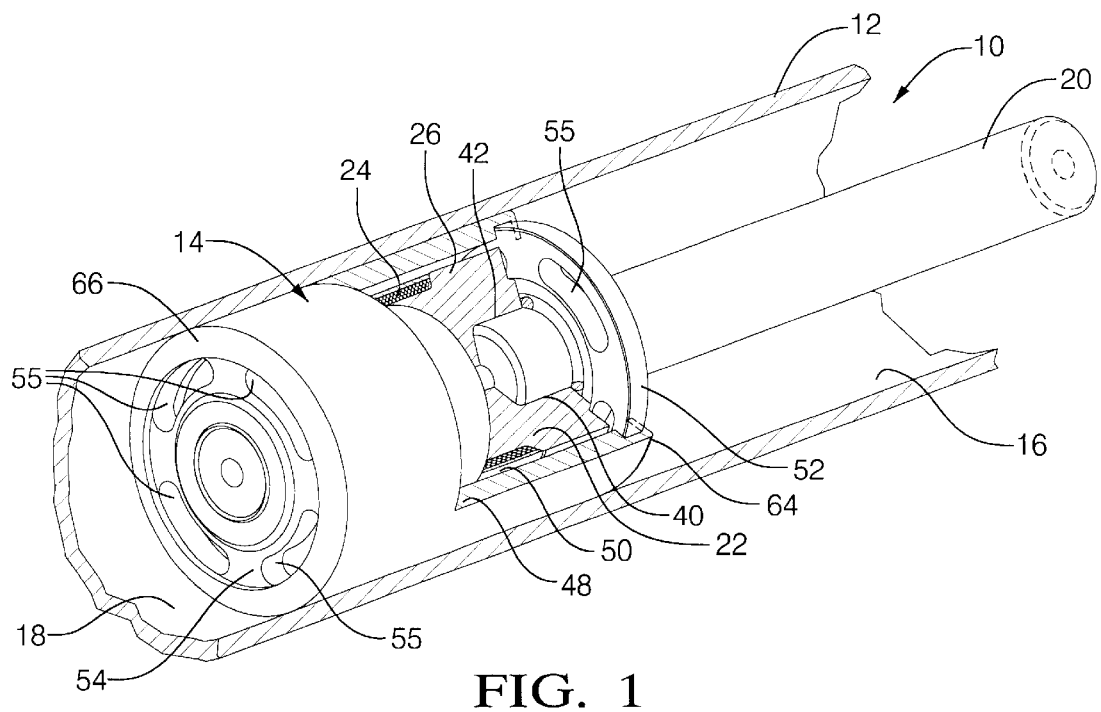
FIG. 1 is a partial cross sectional view of the MR damper of the present invention.
Figure 2:
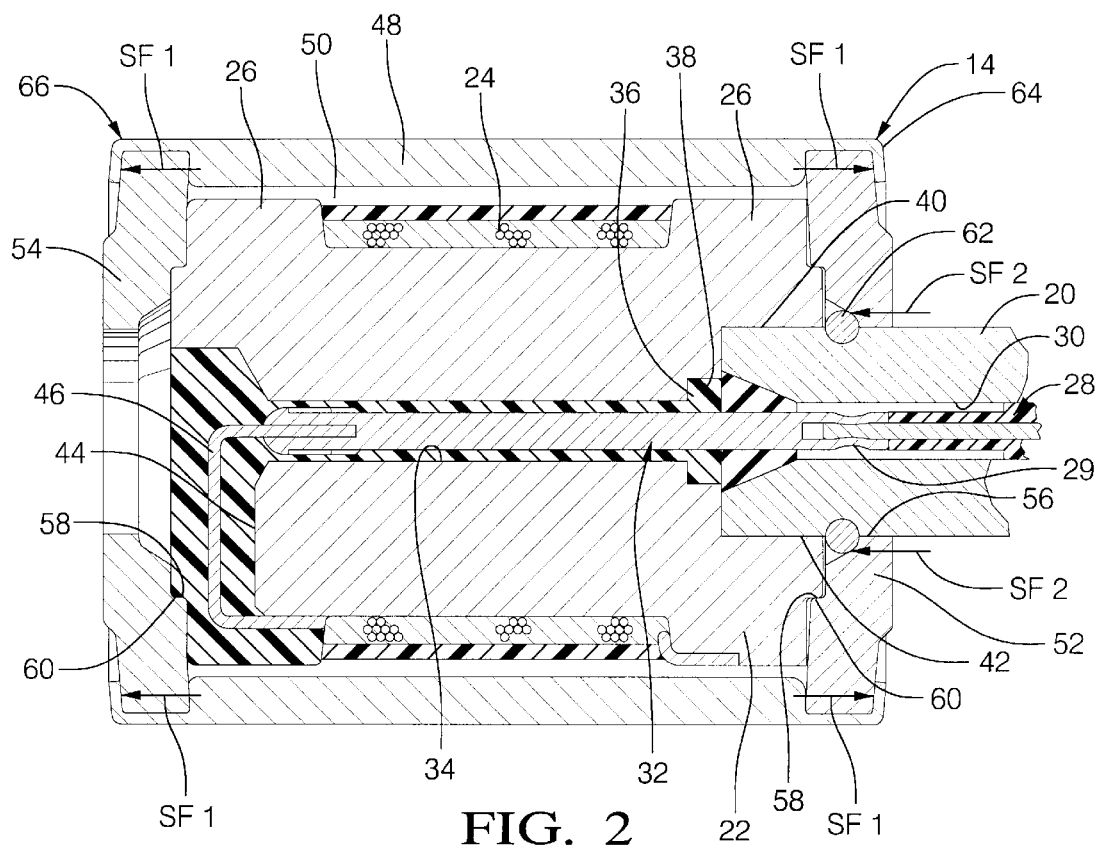
FIG. 2 is a cross sectional view of the piston and magnet assembly of FIG. 1.

Referring to FIGS. 1 and 2, there is shown the magnetorheological fluid damper of the present invention, indicated generally at 10, designed to effectively maintain secure axial and radial alignment of the piston and magnet assembly components throughout operation to permit effective damping while minimizing damper costs and size. The MR damper 10 includes a cylinder 12 containing magnetorheological fluid and a piston and magnet assembly 14 mounted for reciprocal movement in cylinder 12 to form a first chamber 16 positioned on one side of piston and magnet assembly 14 and a second chamber 18 positioned within cylinder 12 on an opposite side of piston and magnet assembly 14.

Piston and magnet assembly 14 includes a cylindrical rod 20 and a piston core 22 mounted on one end of rod 20 and formed of a magnetic material. Piston and magnet assembly 14 further includes a coil 24 mounted on piston core 22 to form flux pole pieces 26 positioned on each axial side of coil 24. Coil 24 is connected to an electrical source (not shown) via an electrical connector 28 extending through a central passage formed in rod 20. A second electrical connector 32 extends through a central bore 34 formed in piston core 22 and extends into central passage to connect with electrical connector 28, such as, for example, by being crimped thereover at 29. A seal member 36 is positioned at one end in a counter bore 38 formed in piston core 22. The opposite end of seal member 36 is frusto-conically shaped and positioned in a complementary shaped recess formed in rod 20 for holding the electrical connectors and preventing leakage of fluid into bore 30 of rod 20. Piston core 22 further includes a radial slot 44 formed at one end thereof for receiving a second connector piece 46 connected to second electrical connector 32 at one end and coil 24 at an opposite end, the slot being otherwise filled with an electrically insulating filler around connector 46.

Piston core 22 also includes a recess 40 at an end opposite radial slot 44 for receiving one end of rod 20. Preferably, the end of rod 20 is positioned in recess 40 to form a nonthreaded interface 42. Preferably, the inner diameter of recess 40 is sized relative to the outer diameter of rod 20 so that nonthreaded interface 42 causes rod 20 to be at least partially secured within recess 40 by, for example, an interference fit.

Piston and magnet assembly 14 also includes an annular flux ring 48 positioned around piston core 22 to form an annular flow gap 50 between the inner annular surface of flux ring 48 and the outer surface of piston core 22 and coil 24. Fundamentally, during damping, magnetorheological fluid present in one of the chambers of cylinder 12 flows through flow gap 50 from, for example, second chamber 18 to first chamber 16 as piston and magnet assembly 14 moves to the left as shown in FIG. 1. Flux ring 48 is designed with an outer diameter sized to form a sliding fluid seal with the inner surface of cylinder 12 so as to permit relative sliding movement while avoiding significant leakage at the interface. The magnetorheological fluid within cylinder 12 may be any conventional fluid including particles containing magnetic material such as iron or iron alloys which are suspended in the fluid and can be magnetically activated and controlled within the fluid by controlling a magnetic field therein to vary the flow characteristics of the fluid through gap 50. The electrical current to coil 24 is varied to vary the magnetic field thereby controlling the flow characteristics of the magnetorheological fluid to achieve the desired damping effect for a given application.

Importantly, damper 10 of the present invention as shown in FIGS. 1 and 2 also includes structure for effectively connecting flux ring 48 to piston core 22 while securing the components of the piston and magnet assembly 14 together to form a unitary assembly. Specifically, piston and magnet assembly 14 includes a first end plate 52 positioned at the rod end of assembly 14 and a second end plate 54 positioned at the opposite end of the assembly. First end plate 52 includes a central bore 56 for receiving rod 20. Each of the first and second end plates 52, 54 includes flow passages 55 for permitting the axial flow of fluid between flow gap 50 and first and second chambers 16, 18. It should be noted that first and second end plates 52, 54 are preferably identical in structure to permit interchangeability and reduce costs. Each of the first and second end plates 52, 54 includes an alignment step 58 for positioning against a respective locating step 60 formed on the respective end of piston core 22. Preferably, the alignment step 58 and locating step 60 are formed annularly around the respective components. In this manner, first and second end plates 52, 54 can be accurately located on the ends of piston core 22 during assembly and maintained in the precise position throughout the assembly process as described hereinbelow. First end plate 52 is positioned to abut a retaining ring 62 positioned in a groove formed on rod 20. Alternatively, rod 20 may be formed with an annular land for engagement by first end plate 52.

Figure 3:
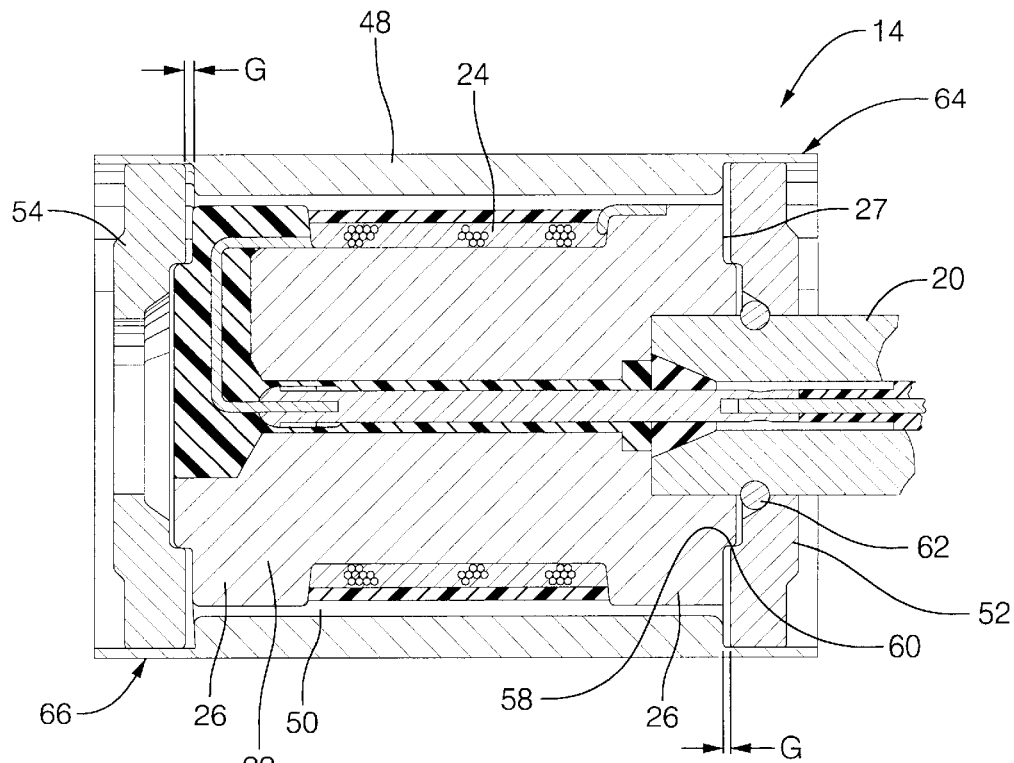
FIG. 3 is a cross sectional view of the piston and magnet assembly of the present invention prior to crimping.

Importantly, the structure for securing flux ring 48 to piston core 22 and for securing the components of piston and magnet assembly 14, including rod 20, together to form a unitary assembly, also includes a first crimp portion 64 formed at one end of flux ring 48 adjacent first end plate 52 and a second crimp portion 66 formed at an opposite end of flux ring 48 adjacent second end plate 54. First and second crimp portions 64, 66 are integral extensions of flux ring 48 which have a relatively smaller radial thickness than the inner portion of flux ring 48 forming flow gap 50. First and second crimp portions 64, 66 are thin-walled extensions having a thickness capable of undergoing a crimping or bending process while having a sufficient thickness to securely engage first and second end plates and hold the components of assembly 14 together in a manner to prevent relative movement between the components throughout operation. As shown in FIG. 3, prior to the crimping or bending process, first and second crimp portions 64, 66 extend axially along an outer annular surface of each end plate and axially beyond the outer axial extent of the end plates to form an overhang that can be crimped inwardly onto the outer face of each end plate as shown in FIG. 2. Therefore, first and second crimp portions 64, 66 not only secure flux ring 48 to first and second end plates 52, 54 but also secure piston core 22 and rod 20 to first and second end plates 52, 54 and flux ring 48.

Importantly, a secure connection between the various components of piston and magnet assembly 14 is maintained by the use of first and second end plates 52, 54 as a spring device to prevent relative movement between flux ring 48 and piston core 22 while ensuring a secure connection between rod 20 and piston core 22. Specifically, each of the first and second end plates 52, 54 function to apply a first spring force indicated by arrows SF1 in FIG. 2, against first and second crimp portions 64, 66 respectively. First spring forces SF1 act in a direction axially outward from the center of piston core 22 and substantially parallel to the central axis of rod 20 and piston core 22. Also, first end plate 52 functions to apply a second spring force, indicated by arrows SF2 in FIG. 2, to rod 20 via retaining ring 62. Specifically, spring force SF2 is applied by the inner radial portion of first end plate 52 against retaining ring 62 thereby forming or maintaining a secure connection between rod and piston core 22.

This spring effect by first and second end plates 52, 54 is achieved in a preferred embodiment of the present invention by crimping or bending first and second crimp portions 64, 66 with sufficient crimping force to cause bending of the outer radial portion of each end plate toward piston core 22. Referring to FIG. 3, prior to the crimping process, an axial gap G is formed between each outer end face of piston core 22 located radially outward from locating step 60 and the opposing face of first and second end plates 52, 54. Likewise, gap G exists between first and second end plates 52, 54 and the opposing face of flux ring 48. During crimping, first and second end plates 52, 54 are bent, i.e. elastically deformed, from the position shown in FIG. 3 to the shape shown in FIG. 2 wherein the outer radial portion of each end plate is brought into contact with the opposing face of flux ring 48 and preferably also the opposing face of piston core 22 radially outwardly from locating step 60. In response, first and second end plates 52, 54 tend to return to their normal straightened position thereby generating first spring force SF1 against the first and second crimp portions 64, 66. This tendency to return to the straightened position of FIG. 3 also causes the inner radial portion of first end plate 52 to be biased against retaining ring 62 thereby applying second spring force SF2 ultimately to rod 20. It should be noted that central bore 56 has a diameter greater than the outer diameter of rod so that first end plate 52 does not contact rod 20. In addition, a radially inner extension of gap G is provided between end plate 52 and axial end 27 of core 26, as seen in FIG. 3. This extension, which exists both radially outward and radially inward of steps 58 and 60, is sufficient to ensure that, when the crimping operation has been completed, an axial gap still exists between the axially opposed surfaces of end plate 52 and core 26, so that a significant portion of the force of end plate 52 is applied as force SF2 to retaining ring 62.

Figure 4:
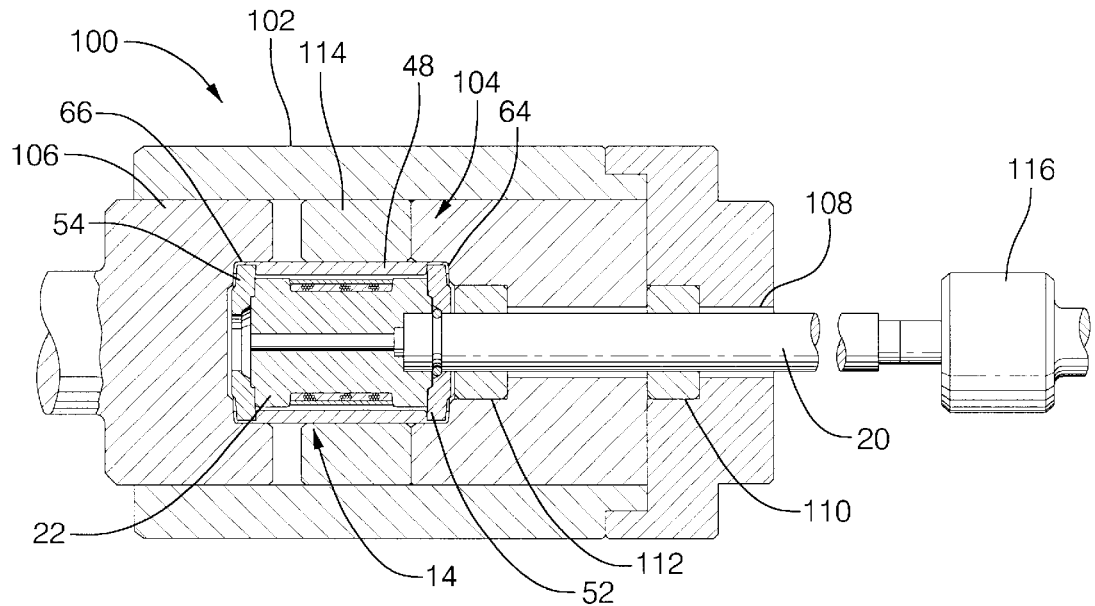
FIG. 4 is a cross sectional view of a crimping tool for crimping the flux ring into engagement with the end plates.

FIG. 4 illustrates a preferred crimping tool for crimping flux ring 48 to form the unitary piston and magnet assembly 14 of the present invention. Although the crimping or bending of first and second crimp portions 64, 66 may be accomplished by any viable device or machine capable of creating a secure crimped interface, the tool 100 effectively permits simultaneous crimping of both first and second crimp portions 64, 66 thereby reducing manufacturing time and costs. Crimping tool 100 includes an alignment sleeve 102 fixedly mounted on a support base (not shown), a lower crimp die 104 positioned within alignment sleeve 102 and an upper crimp die 106 movably mounted relative to alignment sleeve 102 for insertion into sleeve 102. A central bore 108 extends through the lower end of alignment sleeve 102 for receiving rod 20. A first rod locating bushing 110 is positioned in the lower end of alignment sleeve 102 while a second rod locating bushing 112 is positioned within lower crimp die 104 for guiding and supporting rod 20 during the process. A flux ring alignment sleeve 114 is positioned adjacent lower crimp die 104 for supporting flux ring 48. Prior to crimping, first end plate 52 is positioned within lower crimp die 104 and then flux ring 48 is pushed through alignment sleeve 114 so that first end plate 52 is received within the inner end of flux ring 48. Prior to insertion into crimping tool 100, electrical connector 28 and second electrical connector 32 are connected and rod 20 pressed into recess 40. Piston core 22 and connected rod 20 are then moved downwardly through crimping tool 100 into the position shown in FIG. 4. Second end plate 54 is then accurately positioned on the upper end of piston core 22 as shown in FIG. 4, with enough force to ensure the correct positioning of the parts before crimping begins. The locating steps 60 located on each end of piston core 22 effectively ensure the proper radial positioning of first and second end plates 52, 54 on piston core 22. Upper crimp die 106 is then moved vertically downwardly as shown in FIG. 4 by, for example, a hydraulic drive, into engagement with the outer end of flux ring 48. Upper crimp die 106 then continues to move downwardly forcing first and second crimp portions 64, 66 to follow an annular curved section in both the upper crimp die 106 and lower crimp die 104. Crimping tool 100 applies sufficient crimping force to cause bending of first and second end plates 52, 54 into engagement with flux ring 48. Upper crimp die 106 is then removed from alignment sleeve 102 and the piston assembly ejected from tool 100 by an ejector 116. Alternatively, crimp portion 64 may be crimped first followed by crimping of crimp portion 66. In this case, prior to positioning second end plate 54 in tool 100, an upper crimp die, designed to contact the upper face of the thick portion of flux ring 48, is to push flux ring 48 downwardly as shown in FIG. 4 to cause crimping of crimp portion 64. Second end plate 54 would then be inserted into tool 100 and upper crimp die 106 used to bend crimp portion 66.

As a result of the method of the present invention, the various components of piston and magnet assembly 14 including rod 20 are securely and firmly connected in a manner which prevents loosening of the components during operation of MR damper 10. First spring force SF1 and second spring force SF2 function to maintain tight connections between the components even in the presence of various operational forces such as fluid forces acting on piston and magnet assembly 14.

Thus, the MR damper and method of the present invention advantageously creates a damper assembly having components secured together to prevent relative movement throughout operation thereby maintaining the concentricity of the flux ring on the core to control the gap width while creating a secure connection between the piston and rod. The MR damper of the present invention results in a minimum number of damper components by avoiding the use of other connection devices, e.g. a nut/washer arrangement, thereby minimizing the likelihood of problems associated with tolerance stack-up. The locating and alignment steps advantageously permit the control of two dimensions only for precise positioning of the components, that is the diameter of the locating step 60 and the outer diameter of first and second end plates 52, 54. Therefore, the ultimate radial width of the flow gap 50 can be more easily determined by simply controlling the two critical dimensions and letting the components do the critical locating. As a result, only the thickness of the flux ring adjacent the flow gap need be varied to vary the width of the flow gap to achieve different damping affects depending on a particular application. Also, the present MR damper allows the piston core to have maximum flexibility in the number of windings and maximizes the soft iron core area thereby enhancing damper performance. This advantage is achieved by connecting the rod to the piston core without extending the rod entirely through the core by utilizing the crimping design of the present invention.

We claim:

1. A magnetorheological damper, comprising:
   a cylinder containing a magnetorheological fluid;
   a piston and magnet assembly mounted for reciprocal movement in said cylinder to form a first chamber positioned on one side of said piston and magnet assembly and a second chamber positioned on an opposite side of said piston and magnet assembly, said piston and magnet assembly adapted to generate a magnetic field and including a piston core and a flux ring positioned around said piston core to form a flow gap sized to permit magnetorheological fluid flowing through said flow gap to experience a magnetorheological effect affecting the flow of the magnetorheological fluid through said flow gap, said piston and magnet assembly further including a first end plate positioned at one end of said piston assembly, at least one of said flux ring and said first end plate including a first crimp portion connecting said flux ring to said first end plate.

2. The damper of claim 1, wherein said crimp portion is formed on said flux ring, said piston and magnet assembly further including a second end plate positioned at an opposite end of said piston and magnet assembly from said first end plate, said flux ring connected to said second end plate.

3. The damper of claim 2, wherein said flux ring includes a second crimp portion connecting said flux ring to said second end plate.

4. The damper of claim 3, wherein each of said first and said second end plates applies a first spring force to said flux ring to maintain the connection between said flux ring and said first and said second end plates.

5. The damper of claim 4, further including a rod extending through said first end plate, said first end plate adapted to apply a second spring force to said rod to secure said rod to said piston core.

6. The damper of claim 5, wherein said first and said second spring forces are applied substantially in an axial direction.

7. The damper of claim 3, wherein each of said first and said second end plates include an outer annular surface for engagement by said first and said second crimp portions.

8. The damper of claim 7, wherein said piston core includes a first end, a second end and a respective locating step positioned at each of said first and said second ends a fixed predetermined radial distance from a central axis of said rod, said first and said second end plates positioned in abutment with a respective one of said locating steps to determine a radial position of said outer annular surface.

9. The damper of claim 3, further including a rod extending through said first end plate and positioned in abutment with said piston core only at a nonthreaded interface, said first and said second crimp portions connecting said piston core, said rod, said flux ring and said first and said second end plates together to form said piston and magnet assembly.

10. The damper of claim 1, wherein said first crimp portion is formed on said flux ring and extends annularly around said first end plate.

11. The damper of claim 1, wherein said first crimp portion is formed on said flux ring and extends radially along said first end plate.

12. A magnetorheological damper, comprising:
    a cylinder containing a magnetorheological fluid;
    a piston and magnet assembly mounted for reciprocal movement in said cylinder to form a first chamber positioned on one side of said piston and magnet assembly and a second chamber positioned on an opposite side of said piston and magnet assembly, said piston and magnet assembly adapted to generate a magnetic field and including a piston core and a flux ring positioned around said piston core to form a first flow gap sized to permit magnetorheological fluid flowing through said flow gap to experience a magnetorheological effect affecting the flow of the magnetorheological fluid through said flow gap, said piston and magnet assembly further including a spring means for applying a first spring force against said flux ring to prevent relative movement between said flux ring and said piston core.

13. The damper of claim 12, wherein said spring force is applied axially against said flux ring.

14. The damper of claim 13, further including a rod positioned adjacent said piston core, said spring means further functioning for applying a second spring force connecting said rod to said piston core.

15. The damper of claim 12, further including a rod positioned adjacent said piston core, said spring means further functioning at least partially for connecting said piston core, said rod and said flux ring together to form said piston and magnet assembly.

16. The damper of claim 15, wherein said rod is positioned in abutment with said piston core only at a nonthreaded interface.

17. The damper of claim 12, wherein said spring means includes a first end plate positioned at one end of said piston and magnet assembly and a second end plate positioned at an opposite end of said piston and magnet assembly.

18. The damper of claim 17, wherein said flux ring includes a first crimp portion engaging said first end plate and a second crimp portion engaging said second end plate.

19. The damper of claim 18, wherein said piston core includes a first end, a second end and a respective locating step positioned at each of said first and said second ends a fixed predetermined radial distance from a central axis of said piston and magnet assembly, said first and said second end plates positioned in abutment with a respective one of said locating steps.

* * * * *